United States Patent
Roychowdhury et al.

(10) Patent No.: US 10,803,377 B2
(45) Date of Patent: Oct. 13, 2020

(54) CONTENT PRESENTATION BASED ON A MULTI-TASK NEURAL NETWORK

(71) Applicant: Adobe Inc., San Jose, CA (US)

(72) Inventors: Anirban Roychowdhury, Columbus, OH (US); Trung Bui, San Jose, CA (US); John Kucera, San Jose, CA (US); Hung Bui, Sunnyvale, CA (US); Hailin Jin, San Jose, CA (US)

(73) Assignee: Adobe Inc., San Jose, CA (US)

( * ) Notice: Subject to any disclaimer, the term of this patent is extended or adjusted under 35 U.S.C. 154(b) by 1201 days.

(21) Appl. No.: 15/053,448

(22) Filed: Feb. 25, 2016

(65) Prior Publication Data

US 2017/0251081 A1 Aug. 31, 2017

(51) Int. Cl.
*G06N 3/02* (2006.01)
*G06Q 30/02* (2012.01)
(Continued)

(52) U.S. Cl.
CPC .............. *G06N 3/02* (2013.01); *G06N 3/082* (2013.01); *G06N 3/084* (2013.01);
(Continued)

(58) Field of Classification Search
None
See application file for complete search history.

(56) References Cited

U.S. PATENT DOCUMENTS

| | | | |
|---|---|---|---|
| 2006/0026061 A1* | 2/2006 | Collins ................... | G06Q 30/02 705/14.43 |
| 2014/0068011 A1* | 3/2014 | Zhang ..................... | H04L 67/20 709/219 |

(Continued)

OTHER PUBLICATIONS

Ahmed, A., Das, A. and Smola, A.J., Feb. 2014, Scalable hierarchical multitask learning algorithms for conversion optimization in display advertising. In Proceedings of the 7th ACM international conference on Web search and data mining(pp. 153-162). ACM. (Year: 2014).*

(Continued)

*Primary Examiner* — Alexey Shmatov
*Assistant Examiner* — Casey R. Garner
(74) *Attorney, Agent, or Firm* — Kilpatrick Townsend & Stockton LLP

(57) ABSTRACT

Techniques for predictively selecting a content presentation in a client-server computing environment are described. In an example, a content management system detects an interaction of a client with a server and accesses client features. Responses of the client to potential content presentations are predicted based on a multi-task neural network. The client features are mapped to input nodes and the potential content presentations are associated with tasks mapped to output nodes of the multi-task neural network. The tasks specify usages of the potential content presentations in response to the interaction with the server. In an example, the content management system selects the content presentation from the potential content presentations based on the predicted responses. For instance, the content presentation is selected based on having the highest likelihood. The content management system provides the content presentation to the client based on the task corresponding to the content presentation.

20 Claims, 9 Drawing Sheets

(51) Int. Cl.
  G06N 3/08 (2006.01)
  H04L 29/08 (2006.01)
  H04W 4/23 (2018.01)

(52) U.S. Cl.
  CPC ......... G06Q 30/0277 (2013.01); H04L 67/02 (2013.01); H04W 4/23 (2018.02)

(56) References Cited

U.S. PATENT DOCUMENTS

| 2014/0279753 | A1* | 9/2014 | Dalessandro | G06N 5/02 706/12 |
| 2016/0132781 | A1* | 5/2016 | Traupman | G06N 5/048 706/52 |
| 2017/0032035 | A1* | 2/2017 | Gao | G06F 16/3347 |

OTHER PUBLICATIONS

Caruana, R., 1997. Multitask learning. Machine learning, 28(1), pp. 41-75. (Year: 1997).*

Perlich, Claudia, Brian Dalessandro, Troy Raeder, Ori Stitelman, and Foster Provost. "Machine learning for targeted display advertising: Transfer learning in action." Machine learning 95, No. 1 (2014): 103-127. (Year: 2014).*

Li, Sheng, Jaya Kawale, and Yun Fu. "Predicting user behavior in display advertising via dynamic collective matrix factorization." In Proceedings of the 38th International ACM SIGIR Conference on Research and Development in Information Retrieval, pp. 875-878. ACM, 2015. (Year: 2015).*

Chapelle, Olivier, Eren Manavoglu, and Romer Rosales. "Simple and scalable response prediction for display advertising." ACM Transactions on Intelligent Systems and Technology (TIST) 5, No. 4 (2015): 61. (Year: 2015).*

Ozawa, Seiichi, and Asim Roy. "Incremental learning for multitask pattern recognition problems." In 2008 Seventh International Conference on Machine Learning and Applications, pp. 747-751. IEEE, 2008. (Year: 2008).*

Ruvolo, Paul, and Eric Eaton. "ELLA: An efficient lifelong learning algorithm." In International Conference on Machine Learning, pp. 507-515. 2013. (Year: 2013).*

Yue, Simeng, and Seiichi Ozawa. "A Sequential Multi-task Learning Neural Network with Metric-Based Knowledge Transfer." In 2012 11th International Conference on Machine Learning and Applications, vol. 1, pp. 671-674. IEEE, 2012. (Year: 2012).*

Polikar, Robi, Lalita Upda, Satish S. Upda, and Vasant Honavar. "Learn++: An incremental learning algorithm for supervised neural networks." IEEE transactions on systems, man, and cybernetics, part C (applications and reviews) 31, No. 4 (2001): 497-508. (Year: 2001).*

* cited by examiner

CONTENT PRESENTATION BASED ON A MULTI-TASK NEURAL NETWORK

TECHNICAL FIELD

This disclosure relates generally to techniques for customizing content presentation in a client-server computing environment based on utilizing a multi-task neural network.

BACKGROUND

Client-server architectures are popularly used to provide various services. Many of the services are content-related. For example, a client accesses a web page hosted on a server via a web browser. In another example, a client runs a local instance of an application hosted on a server to access content, among other things.

Generally, existing systems implement a service to customize content provided to a client. Referring back to the web page example, a targeted advertisement is inserted in the web page for instance. Existing customization services typically select content that likely results in a particular client response. For example, the advertisement is selected over other potential advertisements when a higher likelihood of conversion is predicted.

Many models are available to predict a client response. Such models include, for example, machine learning models that apply random forests or logistic regressions. In various situations, however, the models are hard to scale up (e.g., when a large number of variations of content exists). The models can also necessitate a large amount of training data. In addition, although having an acceptable accuracy, the models nonetheless sub-optimally predict the client response.

To illustrate, consider the following example of an existing system. The system inserts targeted content in a space of a web page. The targeted content is available from a set of targeted contents. As such, there may be multiple variations of the web page. A variation corresponds to a combination of the web page with one of the targeted contents. For each of the variations, the system implements a logistic regression to generate a prediction model. In turn, each prediction model is trained using historical data about user responses to the respective variation. When a user accesses the web page, the system runs the different prediction models. Based on the predictions, the system selects the targeted content that has the highest likelihood of user conversion. That targeted content is inserted in the banner space of the web page.

However, this existing system is hard to scale up. In particular, the higher the number of targeted contents and, accordingly, web page variations, the harder scaling up the system becomes. The scaling up becomes computationally infeasible (e.g., not enough memory storage or processing power) with a large number of targeted contents.

The system also necessitates a large amount of training data. To train each prediction model, a statistically sufficient amount of historical data needs to be collected and processed for each targeted content. Here again, memory storage and processing power can become limiting factors.

In addition, when a new targeted content becomes available, new training data for the respective web page variation needs to be collected to train a new prediction model. Because the required amount of training data is large, the data collection and the training usually occur over a long period of time, such as weeks. Hence, there is a long delay before the system can actually predict and start inserting the new targeted content in the web page.

Finally, although each prediction model can accurately predict the likelihood of the user conversion for a specific variation, the prediction does not necessarily capture certain underlying or intrinsic relationships between the various user features that would help differentiate the different variations. Thus, the prediction is sub-optimal. To illustrate, consider an example of targeted content for medicine. In this example, there are two targeted contents: one for flu and one for an infection. When a user accesses the web page, the system inserts one of the two targeted contents based on a predicted user conversion given various features of the user. However, when a user feature indicates that the user has fever, that feature does not properly bias the prediction in favor of one of the two targeted contents. As such, the system may insert the flu targeted content when actually the user has an infection and is looking for the infection medicine. This would result in a loss of a user conversion.

SUMMARY

One exemplary embodiment involves predictively customizing a content presentation. Customizing the content presentation involves customizing the content, the presentation of the content, or both. For example, a user operates a client to request content from a server. A content management system detects the request and customizes the content presentation. In an example, the content management system has access to different content presentations. The content management predicts responses of the user to the different content presentations. The best response is determined and the respective content presentation is selected and provided to the client.

Generally, the content management system manages a large number of content presentations for an even larger number of users. For example, millions of users a operate clients to access different content on a daily basis. Predicting user responses necessitates the tracking of a great amount of user data and/or client data. This data includes, for example, features specific to the users (e.g., age, occupation, interests) and the clients (e.g., internet protocol (IP) addresses, internet service provider (ISP) identifiers). In addition, the analysis of this great amount of data should be performed in real-time or substantially real-time. Doing so ensures that the selected and provided content presentations are relevant to the recipient users. Otherwise, the analysis becomes stale. Absent a proper prediction model implemented on a computing system (e.g., such as the content management system), predicting user responses and selecting content presentations in real-time or substantially real-time is infeasible.

In an example, the content management system implements a multi-task neural network as a prediction model. For instance, the content management system implements the multi-task neural network to predict, per content presentation, the likelihood of a desired user response. Unlike existing systems that use a machine learning model per content presentation, the content management system implements a single multi-task neural network for all content presentations. To do so, the inputs and outputs of the multi-task neural network are configured such that for a given set of user-related data, user conversions are predicted for all of the content presentations. The content presentation having the highest conversion rate is selected. A task related to that content presentation is then performed.

In particular, an input layer of the multi-task neural network is mapped to features of the user. For example, each user feature is an element of an input vector to the multi-task neural network. An output layer of the multi-task neural network is mapped to tasks corresponding to the different content presentations. For example, each task corresponds to a particular content presentation and relates to providing content to the user for presentation according to the respective content presentation. A hidden layer of the multi-task network sits between the input and output layers, shares knowledge about the input layer across the tasks, and retains knowledge specific to each task. Historical data about users, content presentations, and responses are used to train the multi-task neural network. The content management system inputs the features of the user to the multi-task neural network, determines the likelihoods of the desired user response (e.g., the user conversion), selects the content presentation having the highest likelihood, and performs the task that the multi-task network defines for that presentation.

To illustrate, consider the example of inserting targeted content in a display space of a web page. A number of various targeted content exists. Accordingly, that same number of web page variations exists. Each web page variation represents a version of the web page containing one of the targeted contents. A multi-task neural network is setup and trained to predict a user conversion when viewing each of the web page variations. When a content request of a client is received, a prediction is made to determine which web page variation would result in the highest likelihood of the user conversion. The respective web page variation is selected and provided to the client. As such, the client displays to a user targeted content that most likely results in the user conversion.

In comparison to existing prediction models, using a multi-task neural network provides various technical advantages, as further described in the present disclosure. For example, accuracy of predicting responses is improved. In another example, a smaller amount of data is needed for training for a new content presentation. The smaller amount of training data facilitates scaling up the multi-task neural network to situations (e.g., to add a large number of new content presentations), where the scaling up was previously computationally infeasible. The smaller amount of training data also reduces the time needed to train for the new content presentation and, accordingly, use the multi-task neural network. In addition, the smaller amount of training data reduces usage of computational resources (e.g., memory and processor committed for the training).

These illustrative features are mentioned not to limit or define the disclosure, but to provide examples to aid understanding thereof. These and additional features may be implemented independently in various embodiments or may be combined in yet other embodiments, further details of which can be seen with reference to the following description and illustrations. Advantages offered by one or more of the various embodiments may be further understood by examining the specification or by practicing one or more of the various embodiments.

BRIEF DESCRIPTION OF THE FIGURES

These and other features, embodiments, and advantages of the present disclosure are better understood when the following Detailed Description is read with reference to the accompanying drawings.

DETAILED DESCRIPTION

Figure 1:
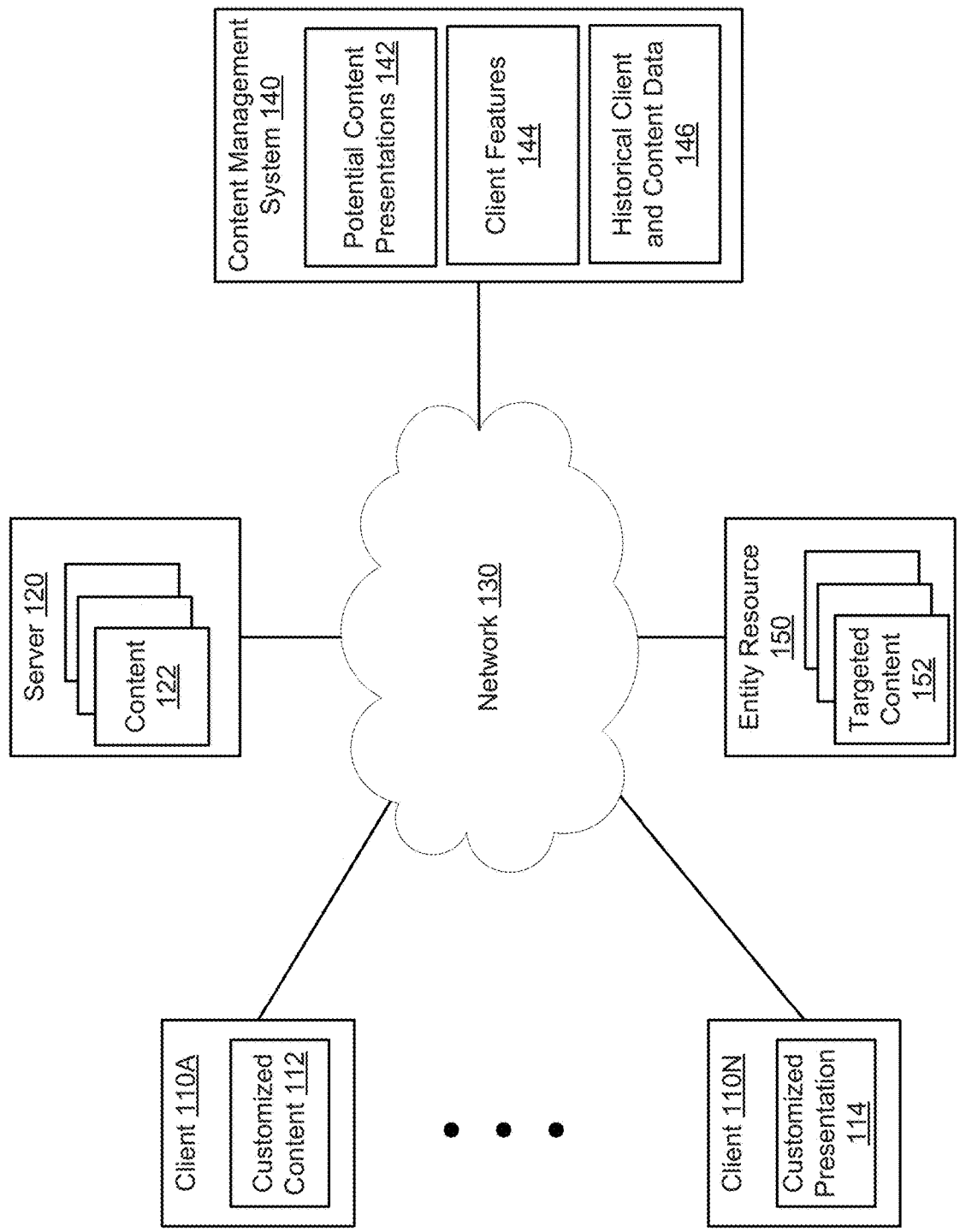
FIG. 1 illustrates an example of a computing environment that includes a content management system for managing content, according to certain embodiments of the present disclosure.

Specific details of various exemplary embodiments of the present invention are set forth in the following description and are illustrated in FIGS. 1-9. The various embodiments described herein can be implemented in hardware, software, or a combination thereof. In the figures, similar symbols may identify similar components, unless context dictates otherwise. Certain well-known technology details, such as methods, apparatus, or systems that would be known by one of ordinary skill, are not set forth in the following description or in the figures to avoid unnecessarily obscuring the various examples. Those of ordinary skill in the relevant art will understand that they can practice other examples of the disclosed subject matter without departing from the scope and spirit of the present invention.

Generally, the embodiments described herein are directed to, among other things, choosing content and/or the presentation of content for a user based on a multi-task neural network. Specifically, disclosed are methods, systems, and computer readable media that embody techniques for predicting a user response to a content presentation and, accordingly, selecting the content presentation from other potential presentations. The user response is predicted based on the multi-task neural network. The prediction accounts for features associated with a user. Once selected, the content presentation is provided to a computing device of the user. Hence, the disclosed techniques predictively customize a content presentation. For instance, in a web environment where a client requests a web page from a server, the disclosed techniques predictively personalize the content of the web page based on features associated with the client (e.g., features of the client itself or features of a user operating the client).

As used herein, a "content presentation" represents a presentation of content. One or more modalities are available for the presentation. Example modalities include a visual display and an audible presentation. Content has digital format and is presented using one or more of the modalities. Example content includes advertisement, multimedia file, structured document, and unstructured document. In addition, different presentation channels are available to provide content from a content source (e.g., a server) to a client (e.g., a computing device of a user). For example, an advertisement is sent to the client over different marketing channels including a banner space in a web page, an advertisement web page, an email, and an advertisement in an application local to the client. Hence, a content presentation includes a presentation of content, where the presentation and/or the content can vary based on presentation modality, content type, and/or presentation channel.

As used herein, a "multi-task neural network" represents a model for predicting a user response. Example embodiments of such a network are further described herein below. Generally, the multi-task neural network includes an input layer, an output layer, and a number of hidden layers in between the input layer and the output layer. The input layer is mapped to features associated with users and/or clients. The output layer is mapped to tasks that are related to content presentations. An example task includes selecting and using a particular content presentation in lieu of other potential content presentations. The hidden layer(s) retains knowledge shared among the tasks and knowledge specific to each task. Based on this knowledge distribution, the hidden layer(s) enables a task selection based on specific inputted features. As such, given specific features that are input to the input layer, the multi-task neural network predicts user responses corresponding to the potential content presentations and selects a task for using one or more of the content presentations.

In an example, a content management system implements a multi-task neural network. Content presentations are known to the content management system. Features associated with users receiving the content presentations are likewise known. The multi-task neural network is setup based on the known user features and content presentations. In particular, an input layer and an output layer are mapped to the user features and tasks related to content presentations, respectively. A dataset is used to train the multi-task neural network. The training dataset includes historical user responses to the content presentations and historical user features.

Thereafter, a user operates a computing device to interact with a network resource and receive content. Upon detecting the interaction, the content management system determines features specific to the user and inputs these features to the multi-task neural network to predict user responses and select a task. Each task corresponds to one of the content presentations. The content management system selects and performs a task (e.g., selects and uses the corresponding content presentations) based on the predicted user responses. The corresponding content presentation is provided to the computing device of the user in response to the interaction with the network resource.

As used herein, a "content management system" represents a computer-implemented component or process for managing content. The management includes customizing a content presentation. For instance, the content management system implements a prediction model, such as a multi-task neural network, to predictively customize the content presentation. In an example, the content management system is hosted on a computing resource that interfaces with a network resource that hosts content. In another example, the content management system is hosted on the network resource. Customizing a content presentation involves customizing content and/or a presentation of the content.

To illustrate, consider an example of inserting advertisement in a banner space of a web page. In this example, ten advertisements (or some other number) are available. Hence, there are ten web page variations, where each variation corresponds to a combination of the web page and one of the advertisements. In also this example, twenty user features (or some other number) are available. Examples of such user features include age, occupation, location, internet protocol (IP) address, and other user-related features. The ten web page variations are mapped to ten tasks of a multi-task neural network. Each task corresponds to using or not using the corresponding web page variation. Likewise, the twenty user features are mapped to twenty input nodes of the multi-task neural network. Over a period of time, access of users to the web page is tracked. For each user, the tracking includes recording the respective user features, the presented web page variation, and the resulting user response (e.g., user conversion or no user conversion). This tracking results in historical data. The historical data is used to train the multi-task neural network. Once trained, the multi-task neural network is deployed to predict user conversions. Hence, upon a new user operating a computing device to access the web page, features specific to that user are determined. Likelihoods of conversions of the user are determined by the multi-task neural network based on the user-specific features. Each likelihood corresponds to one of the web page variations. The web page variation having the highest likelihood is selected. That web page variation is provided to the computing device of the user for presentation thereat. Accordingly, the web page is predictively customized by inserting the advertisement that most likely results in a user conversion.

A content management system that implements the embodied techniques of the present disclosure provides several advantages over existing systems. For example, usage of a multi-task neural network enables sharing of knowledge across the different tasks based on the nature of such a network. The knowledge sharing improves the accuracy of predicting user responses and, correspondingly, the performance of the underlying content management system. As further described herein below, test results show a two to six percent performance improvement relative to existing systems that implement other machine learning models. In addition, a smaller amount of data is needed to train the multi-task neural network when a new content presentation is added. That is because knowledge is shared within the multi-task neural network. Knowledge about features of users who were shown existing content presentations is shared across the tasks. This knowledge can be used immediately to predict responses to the new content presentation even before training the new task corresponding to the new content presentation. In contrast, existing systems generally implement one prediction model per content presentation. Therefore, a completely new model must be trained when a new content presentation is added in such systems. In turn, the smaller amount of training data provides several advantages. One example advantage includes the capability of scaling up the content management system, by adding new content presentations, to situations where the scaling up was previously computationally infeasible (e.g., having to create and train new models). Another example advantage includes reducing the time needed to train for the new content presentations and, accordingly, use the system. Yet another example advantage includes reducing computational resources (e.g., memory and processor) to train the multi-task neural network for the new content presentations. As further described herein below, test results show a significant reduction in the number of training iterations (e.g., an order of magnitude relative to existing systems). Maintaining and updating the multi-task neural network would also necessitate less training data relative to existing systems.

To illustrate, when a new content presentation becomes available, a new task is added to the output layer of the multi-task neural network. A much smaller amount of data is needed to incrementally retrain the multi-task network (e.g., five hundred data points in comparison to thousands of data points for existing systems). That is because knowledge is shared across the tasks and, thus, is propagated to the new task. Hence, existing knowledge is usable for the new content presentation. The time delay associating with utilizing the new content presentation is thereby reduced (e.g., to a couple of days in comparison to weeks for existing systems).

Turning to FIG. 1, the figure illustrates an example computing environment for managing content. Generally, a client interacts with a server to access content. A content management system is configured to detect and track the interaction. The content management system is also configured to predict, based on features associated with the client, a response to a content presentation. The content presentation personalizes the content, the presentation of the content, and/or the presentation channel of the content. If the predicted response is satisfactory, the content management system selects the content presentation. The selected content presentation is provided to the client, thereby presenting the content at the client.

As shown in FIG. 1, a number of clients 110A-110N have access to content 122 hosted on a server 120. In an example, the access occurs over a network 130. A content management system 140 is configured to track the access. The content management system 140 detects an interaction of a client (e.g., the client 110A or the client 110N) with the server 120 over the network 130. In response to the interaction, the content management system 140 predicts responses associated with the client to potential content presentations 144. A particular content presentation is selected according to the predicted responses. The selected content presentation is provided to the client for presentation thereat.

To illustrate, consider the following two examples described in connection with the clients 110A and 110N, respectively. In the first example, the content management system 140 inserts targeted content 152 in the content 122 resulting in a customized presentation 112. That customized presentation 112 is presented (e.g., displayed) at a user interface of the client 110A. In this example, the targeted content 152 is associated with an entity, such as a third party (e.g., a marketer). The entity operates an entity computing resource 150 to generate the targeted content 152 (e.g., an advertisement). The content management system 140 accesses, receives, stores, and/or requests the targeted content 152 from the entity computing resource 150.

In the second example, the content management system 140 selects a particular presentation channel (e.g., an email channel). The content 122 is provided from the server 120 to the client 110N using that presentation channel (e.g., the content 122 is emailed). This results in a customized presentation 114 of the content 122 at the client 110N. In this example, the content management system stores an email address associated with the client 110N (e.g., an email address of a known user of the client 110N). That email address is used to email the content 122 to the client 110N.

Example embodiments of the clients 110A-N, the server 120, the network 130, the content management system 140, and the entity computing resources are described herein next. In an example, a client (e.g., the client 110A or 110N) represents a suitable computing system or computing device that a user operates to access content. Such a system or device can be physical or virtual. For example, the client includes one or more of a personal computer, a desktop, a laptop, a mobile phone, a smartphone, a tablet, or any other end user devices. In comparison, the server 120 represents a suitable computing system or computing device that hosts content. Such a system or device can also be physical or virtual. For example, the server 120 includes a content resource that hosts a web page, a content data network, a server farm, or other content-hosting systems. The network 130 represents a data communication network that can be in part or in full a public network, such as the Internet, or a private network, such as an Intranet.

In an example, the content management system 140 is implemented as a computing system, a computing device, or a computing service configured to manage a content presentation for a client. The management includes tracking over time access of the client to server 120, features associated with the client, content presentations provided to the client, and responses associated with the client to such content presentations. The management also includes predicting responses associated with the client to potential content presentations and, accordingly, customizing a content presentation for the client.

As illustrated in FIG. 1, the client management system 140 stores information about or has access to potential content presentations 142, client features 144, and historical client and content data 146. Predicting the responses is based on such information. The potential content presentations 142 represent known or predefined content presentations that are potentially provided to a client for presentation. Client features 144 represent features associated with the client. In an example, a client feature relates to a user of the client. For instance, the client feature includes an age, occupation, location or other user-related information. In another example, a client feature relates to the client itself. For instance, the client feature includes an IP address of the client, a network to which the client belongs, an identifier of a service provider of the network, and other client-related information. In both examples, personally identifiable information is not used unless consent of the user is received. The historical client and content data 146 represents historical data associated with an interaction of a client with the server 120. Such data includes, for example, historical client features, requested content, previously provided content presentations, historical user responses to such presentations, and other historical data related to client-server interactions.

In an example, the content management system 140 is implemented within an electronic platform operated by a service provider. The electronic platform includes or interfaces with the server 120. An entity (e.g., a marketer) operating the entity computing resource 150 has access to the electronic platform. The access provides different functionalities related to providing the targeted content 152 to clients. For example, the access allows a marketer to send emails, bid on advertisement space within web pages, generate an advertisement web page, bid on keyword searches for presenting advertisement, post advertisement or news on a social media web site, and other marketing services.

The entity computing resource 150 represents a suitable computing system or computing device for interacting with the content management system 140 and/or the electronic platform. For example, the entity has an account at the electronic platform. The entity operates the entity computing resource 150 to access the content management system 140 and perform various functions based on the account. These functions generally relate to managing content presentations. The management includes defining what or when a content presentation should be provided to a client given a set of criteria. An example function includes creating and/or providing the targeted content 152. Another example function includes setting up rules for selecting content presentations. For instance, a rule specifies that a content presentation having the highest likelihood of user conversion or a likelihood that exceeds a threshold should be selected. Yet another function includes tracking metrics about selections of the potential content presentations. Tracking such metrics enables the entity to manage usage of the potential content presentations via the entity computing resource 150. For instance, the targeted content 152 represents advertisement. The metrics indicate that a certain advertisement has a low user conversion. Accordingly, a marketer replaces the advertisement or reallocated resources committed to the advertisement as part of a marketing campaign.

Generally, the computing environment illustrated in FIG. 1 facilitates various applications that relate to customizing content. An example application relates to marketing campaigns. Another application relates to personalizing content. These two examples are described herein next for illustrative purposes. However, the computing environment similarly supports other content-related application.

In a marketing campaign example, the clients 110A-N represent end user devices. The server 120 represents a server that hosts a web site. The network 130 includes the Internet. The entity computing resource 150 represents a computing device of a marketer. In this example, a user operates a computing device to access a web page of the web site over the Internet. The web page includes space for an advertisement. Potential advertisements of the marketer are available for insertion in the advertisement space. For each web page variation, the content management system 140 predicts the likelihood of a user conversion. The web page variation having the highest likelihood is selected. The respective advertisement is inserted in the web page such that the selected web page variation is presented to the user via the computing device.

In a content personalization example, the clients 110A-N represent end user devices. The server 120 represents a content source that stores different versions of content. The network 130 includes the Internet. In this example, a user operates a computing device to access content from the content source via a web browser or some or application local to the computing device. For each content version, the content management system 140 predicts a user response. In this example, the user response represents whether the user would be positively receptive of or is actually looking for the content version. The content management system 140 selects the content version that has the highest likelihood for the user response. That content versions is provided from the server 120 to the computing device.

Generally, a prediction model is implemented for predicting a user response to a content presentation. The content presentation is selected based on the predicted user response. An example prediction model includes a multi-task neural network.

Figure 2:
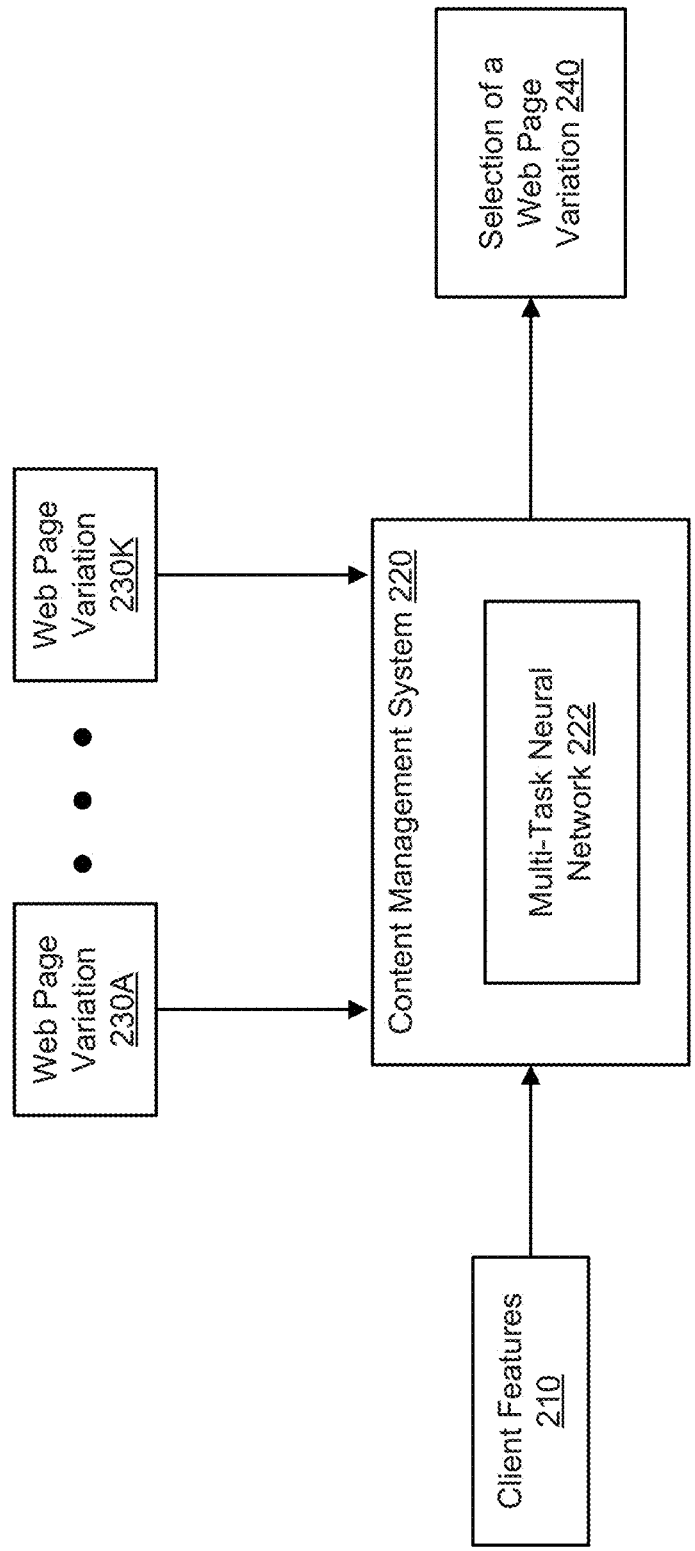
FIG. 2 illustrates an example content management system that implements a multi-task neural network, according to certain embodiments of the present disclosure.

Turning to FIG. 2, the figure illustrates a content management system that implements a multi-task neural network for predicting a user response to a content presentation. In the interest of clarity of explanation, an example of a web page variation is described in connection with FIG. 2. However, the embodiments are not limited as such. Instead, the embodiments similarly apply to other types of content presentation.

The web page variation represents a variation to a web page. Different variations are possible. One example variation relates to the version of content displayed within the web page. For instance, each variation includes a specific advertisement inserted in an advertisement space of the web page. Another example variation relates to the placement or format of content within the web page. For instance, each variation includes a different placement or format of the same content within the web page.

As illustrated, client features 210 are accessed by a content management system 220. The client features 210 are specific to a client. These features are accessed in response to an interaction of the client with a server hosting the web page. Different web page variations 230A-230K are also available to the content management system 220. In an example, the content management system 220 includes some or all of the elements of the content management system 140 of FIG. 1.

The content management system 220 implements a multi-task neural network 222. An example of such a network is further illustrated in FIG. 3. Briefly, an input layer of the multi-task neural network 222 is mapped to client features. An output layer of the multi-task neural network 222 is mapped to tasks. Each tasks corresponds to a selection of one of the web page variations 230A-230K for presentation to a user. A hidden layer of the multi-task neural network 222 retains knowledge shared among the tasks and knowledge specific to each task. The multi-task neural network 222 is trained to predict responses to the web page variations 230A-230K (e.g., user conversions for presenting different advertisements).

The content management system 220 inputs the client features 210 to the multi-task neural network 222. A response is accordingly predicted for each of the web page variation 230A. The content management system 220 determines a satisfactory response out of the predicted responses. For example, the satisfactory response corresponds to the one having the highest likelihood of user conversion. The content management system 220 identifies the web page variation responsible for the satisfactory response. Accordingly, a selection 240 of that particular web page variation is made. The web page is provided to the client in response to the interaction of the client with the server.

Figure 3:
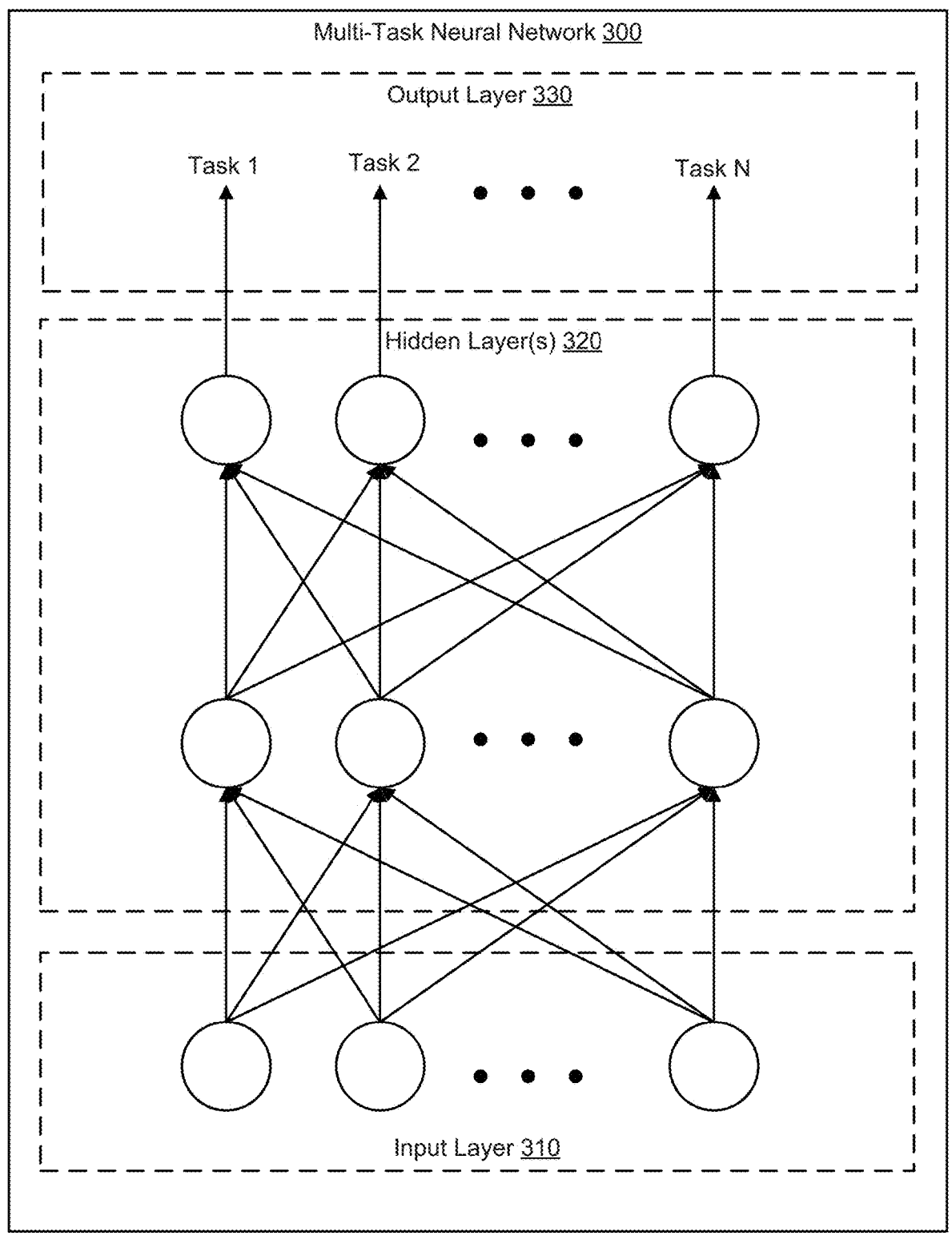
FIG. 3 illustrates an example multi-task neural network, according to certain embodiments of the present disclosure.

Turning to FIG. 3, the figure illustrates an example multi-task neural network 300. A content management system implements the multi-task neural network 300 as a prediction model to customize content presentations.

Generally, the multi-task neural network 300 represents a network of interconnected nodes, such as an artificial neural network, where knowledge about the nodes is shared across tasks and knowledge specific to each task is also retained. Each node represents a piece of information. Knowledge can be exchanged between through node-to-node interconnections and node-to-task connections. Input to the multi-task neural network 300 activates a set of node. In turn, this set of node activates other nodes, thereby propagating knowledge about the input. This activation process is repeated across other nodes until an output task is selected and activated.

As illustrated, the multi-task neural network 300 includes a hierarchy of layers representing a hierarchy of nodes. At the lowest hierarchy level, an input layer 310 exists. The input layer 310 includes a set of nodes that are referred to herein as input nodes. Each of these input nodes is mapped to a particular client feature.

At the highest hierarch level, an output layer 330 exists. The output layer 330 is mapped to tasks. Each of the tasks is mapped to a particular content presentation. Thus, the example neural network is referred to as a multi-task neural network. A task represents an action that can be initiated or performed with respect to the respective content presentation. For instance, the task includes selecting or deselecting the content presentation for presentation to a client. To illustrate, one task corresponds using a particular web page variation (e.g., inserting a particular advertisement in a web page). Another task corresponds to using a different web page variation (e.g., inserting a different advertisement in the web page). Yet another tasks corresponds to using a different presentation type (e.g., providing the particular advertisement in an email instead of insertion in the web page).

A hidden layer 320 exists between the input layer 310 and the output layer 330. The hidden layer 320 includes "N" number of hidden layers, where "N" is an integer greater than or equal to one. In turn, each of the hidden layers also includes a set of nodes that are referred to herein as hidden nodes.

At the lowest level of the hidden layer 320, hidden nodes of that layer are interconnected to the input nodes. At the highest level of the hidden layer 320, hidden nodes of that are connected in a one-to-one connection to the tasks. In other words, each task connects to one hidden node. The input nodes are not directly interconnected to the tasks. If multiple hidden layers exist, the input nodes are interconnected to hidden nodes of the lowest hidden layer. In turn, these hidden nodes are interconnected to the hidden nodes of the next hidden layer and so on and so forth.

An interconnection represents a piece of information learned about the two interconnected nodes. In comparison a connection between a hidden node and a tasks represents a piece of information learned through the lower nodes (e.g., based on knowledge learned across the input nodes) and specific to the task. The interconnection has a numeric weight that can be tuned (e.g., based on a training dataset), rendering the multi-task neural network 300 adaptive to inputs and capable of learning.

Generally, the hidden layer 320 allows knowledge about the input nodes of the input layer 310 to be shared among all the tasks of the output layer 330. To do so, a transformation $f$ is applied to the input nodes through the hidden layer 320. In an example, the transformation $f$ is non-linear. Different non-linear transformations $f$ are available including, for instance, a rectifier function $f(x)=\max(0, x)$. In an example, a particular non-linear transformations $f$ is selected based on cross-validation. For example, given known example pairs $(x, y)$, where $x \in X$ and $y \in Y$, a function $f: X \rightarrow Y$ is selected when such a function results in the best matches.

The multi-task neural network 300 also uses a cost function c to find an optimal solution. The optimal solution represents the situation where no solution has a cost less than the cost of the optimal solution. In an example, the cost function c includes a mean-squared error function that minimizes the average squared error between an output $f(x)$ and a target value y over all the example pairs $(x, y)$. A backpropagation algorithm that uses gradient descent to minimize the cost function is used to train the multi-task neural network 300.

As such, the hidden layer 320 retains knowledge about the input nodes. A set of knowledge is shared across the tasks based on the interconnections of the hidden nodes and the input nodes. Another set of knowledge is specific to each task based on the connection of a hidden node to the task.

Figure 4:
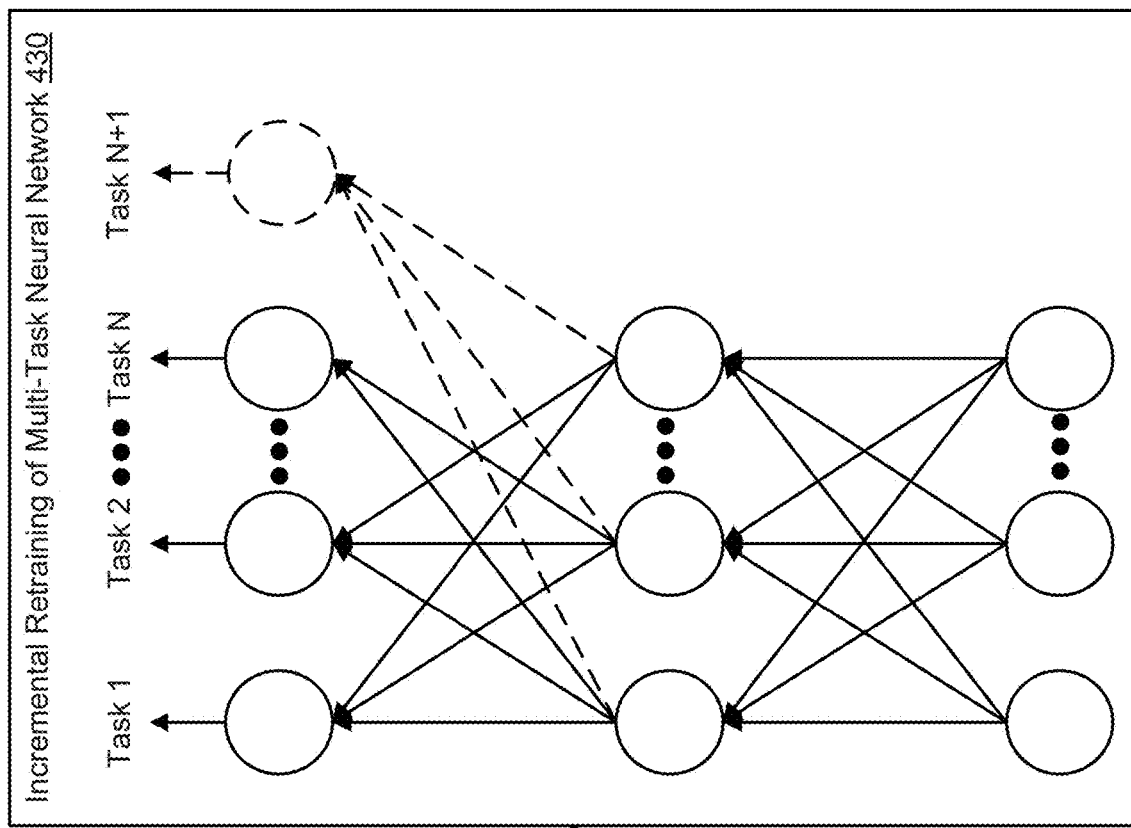
FIG. 4 illustrates an example training and retraining a multi-task neural network, according to certain embodiments of the present disclosure.
Figure 4:
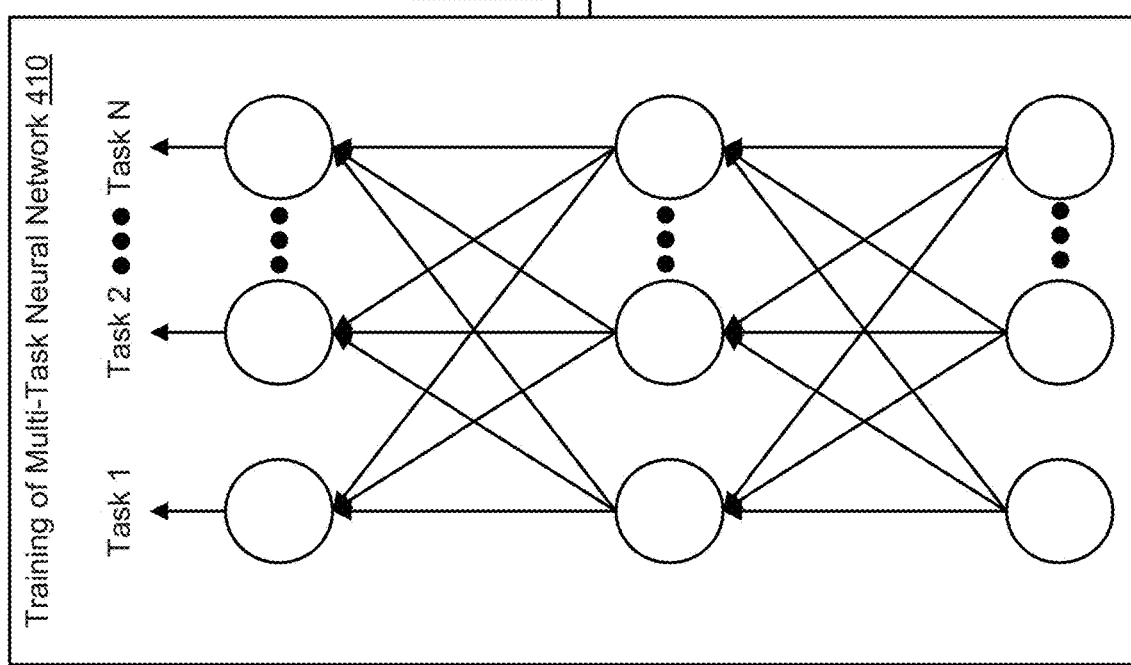

Turning to FIG. 4, the figure illustrates an example of training 410 and retraining 430 a multi-task neural network, such as the multi-task neural network 300 of FIG. 3. A training dataset is used in both cases.

The training dataset includes historical client and content data. For example, the training dataset includes known example pairs (x, y). x corresponds to client data such as historical client features observed when the respective clients were exposed to the content presentations. In comparison, y corresponds to historical user responses observed when the clients were exposed to the content presentations.

In an example of the training 410, a task is selected for a specific data instance of the training dataset (e.g., a specific inputted set of client features x). A label of this current task is set to a binary value (e.g., to a "1" for a user conversion, or a "0" for a no-user conversion). The labels of the remaining tasks may not exist. If so, the non-existent labels are denoted by a dummy value and ignored. The back-propagation algorithm is applied so that if a label is non-existent for a given task, the back-propagated gradient from that task is set to zero. Similarly, the back-propagation algorithm is applied across the different tasks and across the entire training dataset. Numeric values of the node-to-node interconnections and node-to-task connections are accordingly generated, thereby training the multi-task neural network.

In an example of the retraining 430, the retraining 430 is triggered by various events. An example event includes the addition of a new content presentation, such as a new web page variation 420. This corresponds to adding a new task. Other trigger events are also possible. For instance, the addition of new client features (and, thus, the addition of new input nodes) can be a trigger event. Similarly, a selection of a new non-linear transformation $f$ for a hidden layer (and, thus, a change to the hidden nodes) can also be a trigger event. In addition, there can be situations where an input node or a task is removed. This can be the case when, for example, a client feature is no longer tracked or a content presentation is no longer available. In such cases, the retraining 430 need not be performed.

In an example, the retraining 430 implements an incremental approach. In this approach, existing knowledge of the multi-task neural network is retained and transferred to the added task (e.g., the newly added task for using the new web page variation 420). Additional training data for the added task is collected. That training data is specific to the added task. For instance, user conversions in response of the new web page variation 420 are collected. That amount of training data is significantly smaller than the amount of training data needed for training the entire multi-task neural network. Thus, the retraining 430 becomes incremental. In this example, the existing knowledge is propagated to the new task through the hidden layer.

As explained herein above, similar incremental training is available for adding nodes. For example a new client feature is added. This result in adding a new input node but no new task is added. The existing knowledge is used for the existing tasks. No shared knowledge is propagated to the new input node. The retraining 430 involves collecting training data specific to the new client feature and using the back-propagated gradient algorithm for the incremental training.

In another example, the retraining 430 need not implement an incremental approach. Instead, the retraining 430 involves training anew the entire multi-task neural network. Under this approach, the existing knowledge is not retained.

The incremental retraining approach provides various advantages over the entire retaining approach. For example, a smaller amount of training data is used. This also results in a quicker convergence in the retraining 430. As illustrated in the example test results of FIG. 8, the convergence rate is significantly sped up. In addition, the time delay associated with collecting the data and the retraining 430 is reduced.

Figure 5:
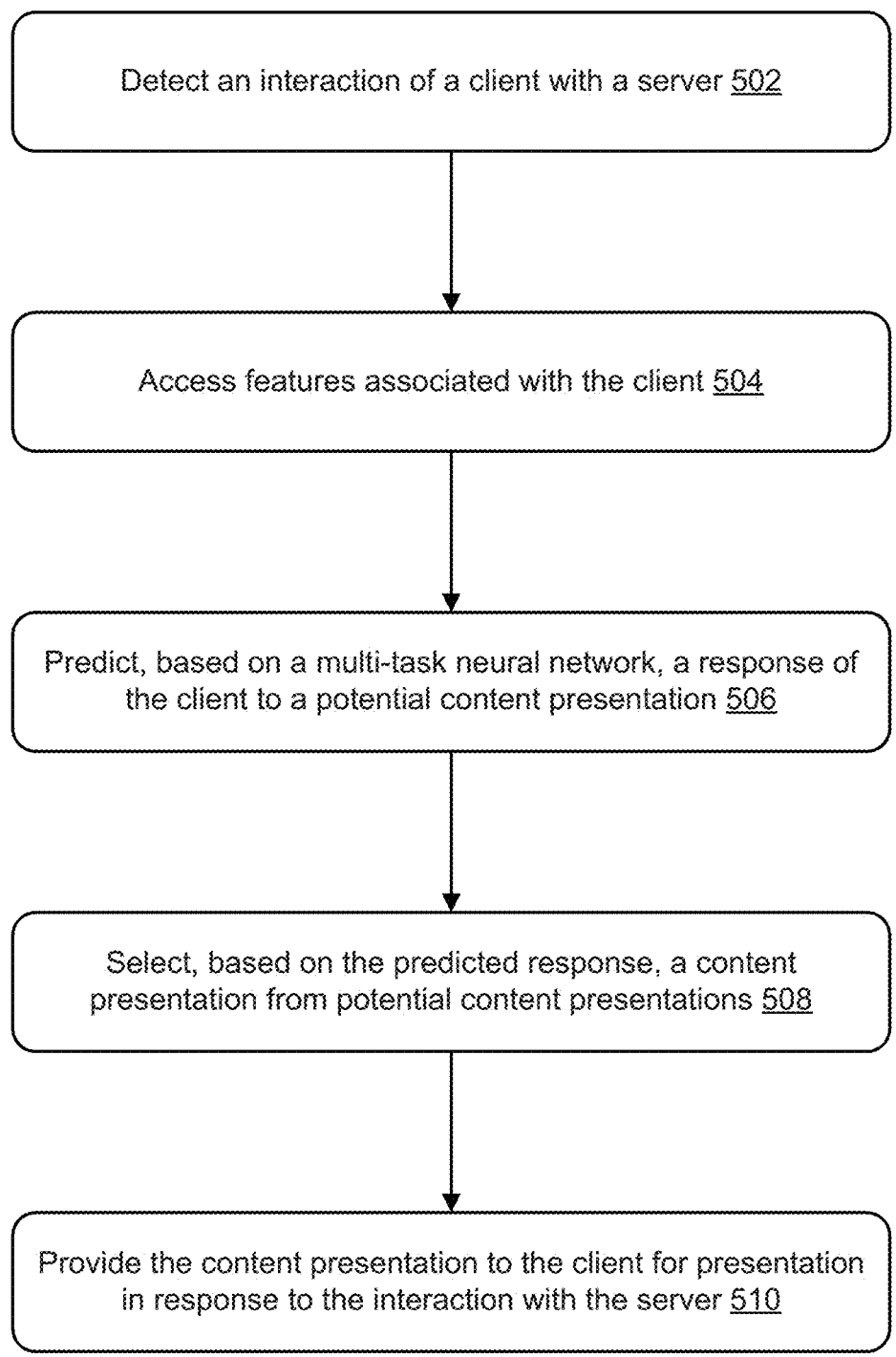
FIG. 5 illustrates an example flow for managing content based on a predicted user response, according to certain embodiments of the present disclosure.
Figure 6:
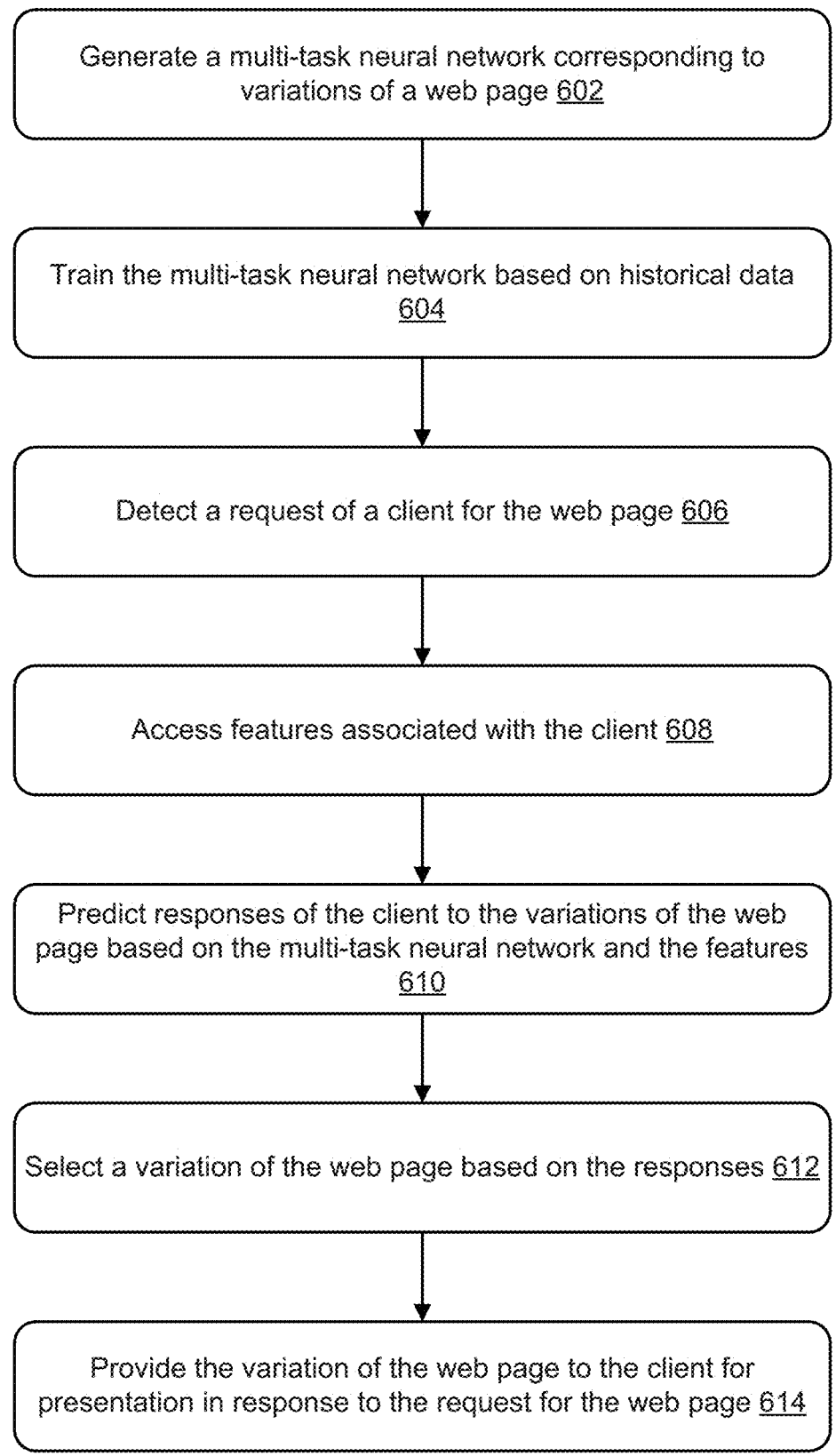
FIG. 6 illustrates an example flow for selecting a web page variation based on a predicted user response, according to certain embodiments of the present disclosure.

Turning to FIGS. 5-6, the figures illustrate example flows related to customizing a content presentation. In particular, FIG. 5 illustrates an example flow for customizing the content presentation based on a prediction of a user response. The prediction is generated based on a multi-task neural network. In comparison, FIG. 6 illustrates an example flow for selecting a web page variation. Selecting a web page variation is an example of customizing a content presentation. Hence, some of the operations are similar between the two example flows. Such similarities are not repeated herein in the interest of clarity of explanation.

While the operations are illustrated in a particular order, it should be understood that no particular order is necessary and that one or more operations may be omitted, skipped, and/or reordered. In the interest of clarity of explanation, a content management system is illustrated as performing the illustrative operations. The content management system implements some or all of the components and modules illustrated in FIGS. 1-4. Nevertheless, other systems, or specific modules hosted on such systems, can be configured to implement one or more of the operations and/or one or more steps of the operations.

The example flow of FIG. 5 starts at operation 502, where an interaction between a client and a server is detected. For example, the content management system detects that the client requested access to content hosted on the server. Several detection techniques are possible and depend on the type of access. For instance, in the case of web-based content, the content management system detects the interaction based on a IP address of the client, IP address of the server, and/or a uniform resource locator (URL) of the content.

At operation 504, features associated with the client are accessed. For example, the content management system accesses the features based on the interaction. Some of the features are received from the client such as, for instance, the IP address of the client. Other features are identified from a data store local or remotely accessible to the content management system. For instance, a known location of the client and known information about a user operating the client are stored at the data store. The content management system queries the data store using features received from the client (e.g., the IP address) to access the stored features.

At operation 506, a response to a potential content presentation is predicted. The response is associated with the client and includes, for example, the response of the user when receiving and interacting with the content presentation. In an example, the content management system predicts the response based on a multi-task neural network such as the multi-task neural network 300 of FIG. 3. For instance, the content management system inputs the features associated with the client to the multi-task neural network. Likelihoods of the response are estimated by the multi-task neural network. Each likelihood corresponds to a potential content presentation and indicates a predicted response to the potential content presentation given the features associated with the client.

At operation 508, a content presentation is selected from the potential content presentations. The selection is based on the predicted response to the potential content presentation. For example, the content management system compares the predicted response to the other responses and determines that the predicted response is satisfactory. Accordingly, the content management system selects a content presentation. In an example, the determination whether the predicted response is satisfactory involves using one or more rules. The rules can be defined by a service provider of the content management system or by an entity providing targeted content. An example rule specifies that the potential content presentation should be selected if the respective likelihood of the response is the highest. Another example rule specifies that the potential content presentation should be selected if the respective likelihood exceeds a predefined threshold. In an example, the satisfactory response corresponds to a task of the multi-task neural network. That task specifies the usage of the content presentation (e.g., to insert a particular content in a web page). The content management system performs the task.

At operation 510, the selected content presentation is provided to the client for presentation in response to the interaction with the server. Different techniques are available to provide the content presentation and depend on the type of the content presentation. In an example, the content management system inserts targeted content in the requested content such that the client receives and presents both the targeted and requested content. In another example, the content management systems selects a presentation channel to send the content to the client. While the content itself is not augmented or modified in this example, the presentation channel is customized for the client. For instance, the client receives the content via an email instead of a web page display.

Turning to FIG. 6, the figure illustrates another example flow for customizing a content presentation. Here, a web page variation is described as an example of the content presentation. However, the example flow similarly applies to other types of the content presentation.

The example flow of FIG. 6 starts at operation 602, where a multi-task neural network is generated. The multi-task network corresponds to variations of a web page, referred to herein as web page variations. For example, the web page has an advertisement space. Each variation corresponds to a different advertisement that can be placed in the advertisement space and/or to the placement of the advertisement space within a displayable location of the web page. In an example, the content management system stores information about the different web page variations and different client features. A service provider operates the content management system to generate the multi-task neural network. An input layer containing input nodes of the multi-task network is mapped to the different client features such as each input node represents a piece of information about a client or a user of the client. An output layer containing tasks of the multi-task network is mapped to the different web page variations such as each output task relates to one of the web page variations. A non-linear transformation function is selected and used for a hidden layer of the multi-task neural network.

At operation 604, the multi-task neural network is trained based on historical data. For example, the content management system tracks and records data associated with accesses and responses of clients to the web page variations. Such data is used to train the multi-task neural network. In addition, if a new web page variation or a new client feature is added, the content management system retrains existing knowledge of the multi-task neural network. In an example, the retraining is incremental. In this example, the content management system tracks and records data specific to the new web page variation or new client feature. That data is used in the retraining while the existing knowledge of the multi-task neural network is retained.

At operation 606, a request of a client for the web page is detected. For example, the content management system detects that the client requested the web page from a server. A user operates the client to request the web page. At operation 608, features associated with the client are accessed. The features include user-specific and client-specific features. In an example, the content management system receives a portion of the features from the client and retrieves another portion of the features from a data store.

At operation 610, responses to the web page variations are predicted based on the multi-task neural network and features associated with the client. The responses include, for instance, whether a user conversion will likely occur in response to displaying a web page variation that includes a targeted advertisement and/or a targeted placement of an advertisement within the web page. In an example, the content management system inputs the user-specific and client-specific features to the content management system. Likelihoods of the responses are estimated accordingly and correspond to the different web page variations.

At operation 612, a web page variation is selected based on the responses. For example, the content management system selects the web page variation out of the different web page variations for having the highest likelihood of user conversion or having an acceptable likelihood relative to a threshold. Additionally or alternatively, content management system identifies a task corresponding to the web page variation. That task is defined in an output layer of the multi-task neural network. The content management system performs that task.

At operation 614, the web page variation is provided to the client for presentation in response to the request for the web page. In an example, the web page variation includes a targeted advertisement. The content management system inserts the targeted content in the web page by, for instance, adding a URL address of the targeted content to the HTML code of the web page. In another example, the web page variation includes a targeted placement of the advertisement. The content management system updates the HTML code of the web page to positing the advertisement according to the targeted placement.

Figure 7:
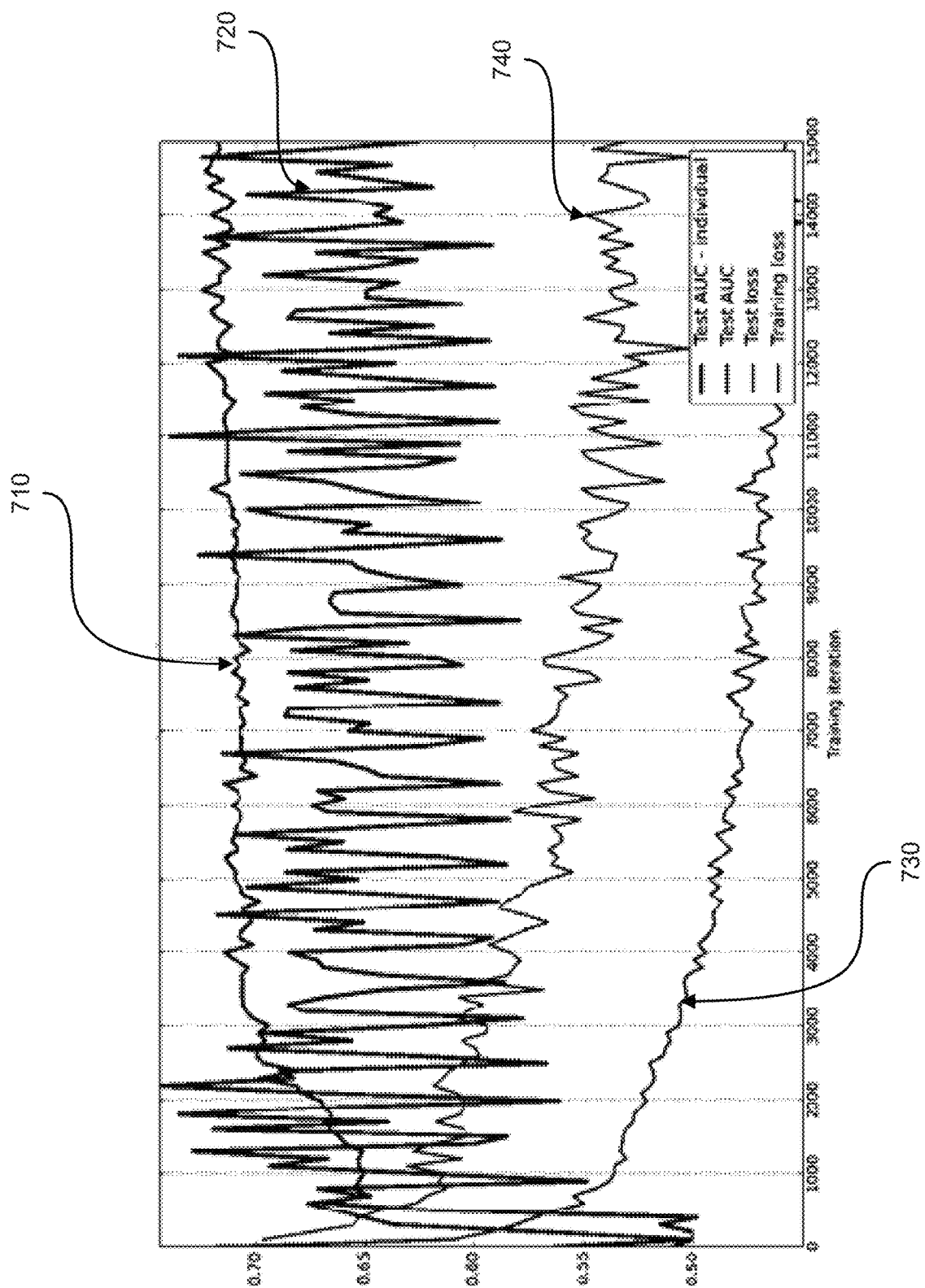
FIG. 7 illustrates an example test result showing the conversion of a prediction model that implements a multi-task neural network, according to certain embodiments of the present disclosure.
Figure 8:
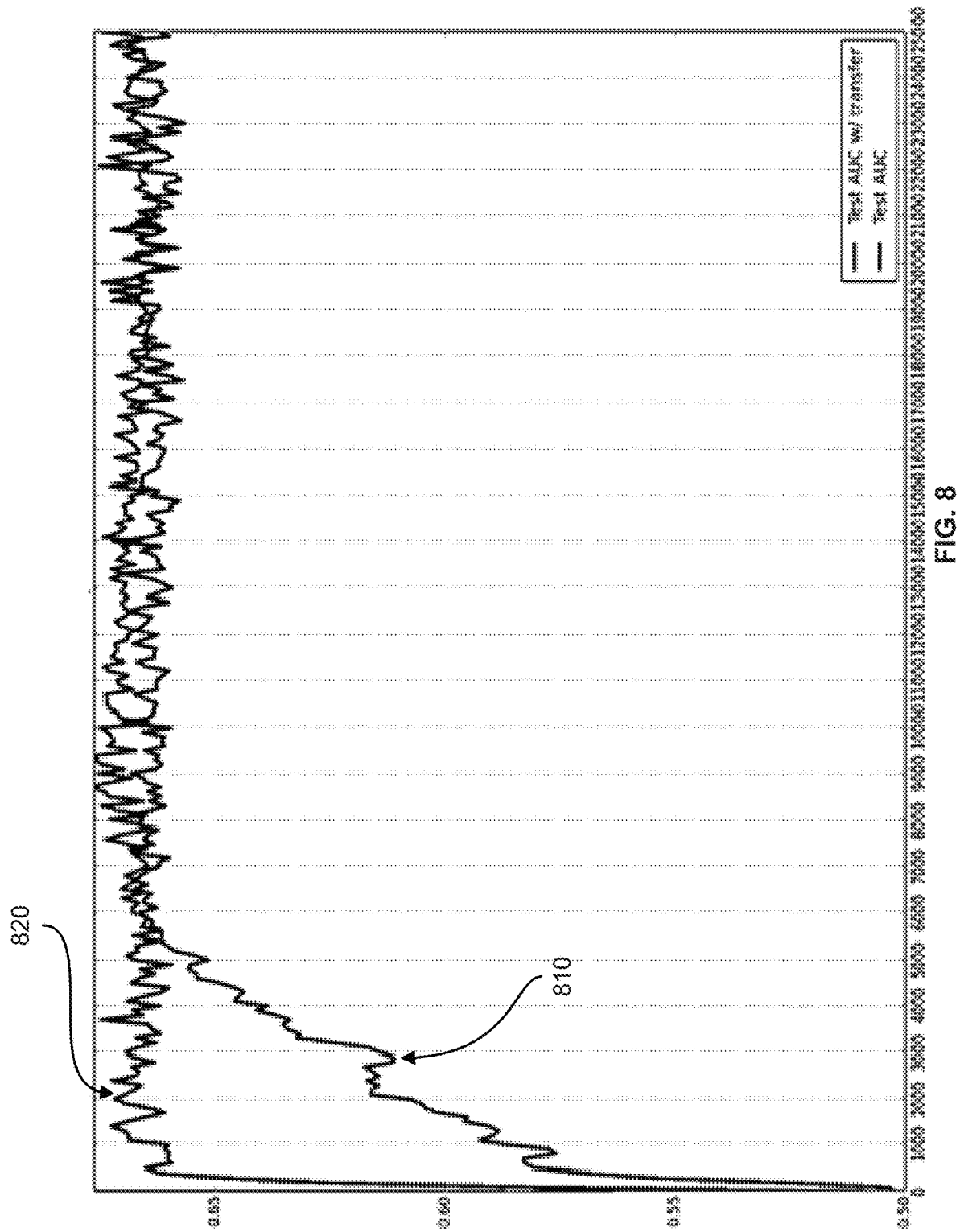
FIG. 8 illustrates an example test result showing the training of a prediction model that implements a multi-task neural network, according to certain embodiments of the present disclosure.

Turning to FIGS. 7 and 8, the figures illustrate test results associated with implementing a multi-task neural network in connection with web page variations. To better understand the test results, the test setup is described herein next.

In a first test setup, 60,585 records were collected for 6 web variations and 253 features. Random forest (RF) and logistic regression (LR) models were used for a baseline. A neural network was setup having two hidden layers that use rectifier functions. Two types of setup were used for training the neural network. First, one neural network was individually trained per variation. This is referred to in the test results as "Individual network". Second, a single multi-task neural network was trained collectively across all of the variations. This neural network is referred to in the test results as "Multi-task network". A standard area under the curve (AUC) test was used to measure the performance of the RF, LR, individual network, and multi-task network. Below is a table showing the performance metrics across the six web variations.

| Web Variation | RF | LR | Individual network | Multi-task network | Improv. Over RF | Improv. Over LR |
|---|---|---|---|---|---|---|
| 1 | 0.68 | 0.67 | 0.65 | 0.68 | 0.00% | 1.49% |
| 2 | 0.66 | 0.69 | 0.64 | 0.71 | 7.57% | 2.90% |
| 3 | 0.68 | 0.7 | 0.67 | 0.71 | 4.41% | 1.43% |
| 4 | 0.7 | 0.69 | 0.68 | 0.72 | 2.86% | 4.35% |
| 5 | 0.68 | 0.66 | 0.66 | 0.68 | 0.00% | 3.03% |
| 6 | 0.7 | 0.69 | 0.66 | 0.71 | 1.43% | 2.90% |
| Average | 68.33 | 68.33 | 65.00 | 70.17 | 2.71% | 2.68% |

As shown in the above table, the multi-task network has the best performance for all variations. On average, the multi-task network outperformed the RF model by 2.71% (e.g., resulted in a 2.71% increase in AUC) and the LR model by 2.68%.

In addition to the AUC performance metric, the accuracy of predicting a user conversion was assessed for each model. The below table shows the resulting accuracy.

| Web Variation | RF | LR | Individual network | Multi-task network | Improv. Over RF | Improv. Over LR |
|---|---|---|---|---|---|---|
| 2 | 0.76 | 0.82 | 0.82 | 0.83 | 9.21% | 1.22% |
| 2 | 0.74 | 0.76 | 0.8 | 0.8 | 8.11% | 5.26% |
| 3 | 0.8 | 0.77 | 0.85 | 0.81 | 1.25% | 5.19% |
| 4 | 0.79 | 0.78 | 0.82 | 0.85 | 7.59% | 8.97% |
| 5 | 0.75 | 0.77 | 0.8 | 0.81 | 8.00% | 5.19% |
| 6 | 0.78 | 0.77 | 0.74 | 0.82 | 5.13% | 6.49% |
| Average | 77.00% | 77.83% | 80.50% | 82.00% | 6.55% | 5.39% |

As shown in the above table, the multi-task network has the best accuracy for all variations except variation 3 on which the individual network approach was slightly better. On average, the multi-task network is 6.55% more accurate than the RF model and 5.39% than the LR model.

A similar test was also performed for another dataset. That dataset included 11 web page variations, 453 features, and 371,000 records. On average, the multi-task network outperformed the RF model (as measured by AUC) by 2.86% and the LR model by 5.66%. The performance metrics of that test are shown in the table below. In this table the numbers under the column headings of "RF", "LR", "Individual network", and "Multi-task network" are AUC values, while the numbers in the columns labeled "Improv. Over RF" and "Improv. Over LR" are the percentage increase (or decrease) of the AUC.

| Web Variation | RF | LR | Individual network | Multi-task network | Improv. Over RF | Improv. Over LR |
|---|---|---|---|---|---|---|
| 1 | 0.55 | 0.55 | 0.65 | 0.67 | 21.82% | 21.82% |
| 2 | 0.6 | 0.57 | 0.54 | 0.57 | -5.00% | 0.00% |
| 3 | 0.66 | 0.61 | 0.59 | 0.61 | -7.51% | 0.00% |
| 4 | 0.56 | 0.53 | 0.53 | 0.55 | -1.78% | 3.77% |
| 5 | 0.62 | 0.6 | 0.55 | 0.59 | -4.84% | -1.67% |
| 6 | 0.55 | 0.54 | 0.63 | 0.64 | 16.36% | 18.52% |
| 7 | 0.66 | 0.66 | 0.58 | 0.61 | -7.57% | -7.57% |
| 8 | 0.6 | 0.57 | 0.65 | 0.67 | 11.67% | 17.54% |
| 9 | 0.54 | 0.54 | 0.52 | 0.53 | -1.85% | -1.85% |
| 10 | 0.63 | 0.62 | 0.59 | 0.61 | -3.17% | -1.61% |
| 11 | 0.6 | 0.6 | 0.63 | 0.68 | 13.33% | 13.33% |
| Average | 59.73 | 58.09 | 58.73 | 61.18 | 2.86% | 5.66% |

Turning to FIG. 7, the figure illustrates convergence rates and behavior observed for the second web page variation in the first dataset (the 6 web variations, 253 features, and 60,585 records). Curve 710 is the AUC of the multi-task network. Curve 720 is the AUC of the individual network approach. Curve 730 relates to the training loss. Curve 740 relates to the test loss. The horizontal axis shows the training iterations. The vertical axis shows the performance. As illustrated, the performance of the multi-task network is stable at about 0.71 after four thousand iterations. In comparison, the performance of the individual network exceeded the 0.71 average at certain training iterations. However, this performance is unstable across the training iterations.

Turning to FIG. 8, the figure illustrates the convergence observed for the first web page variation in the second dataset (the 11 web page variations, 453 features, and 371,000 records). The horizontal axis shows the training iterations. The vertical axis shows the AUC performance. The test result illustrates that incremental retraining improves the convergence significantly. In particular, for this test result, the multi-task neural network was trained in two different ways.

First, the multi-task network was fully trained with all of the 371,000 records for the 11 web page variations. Curve 810 shows the convergence for the first web page variation when this type of training was used. As illustrated, the convergence occurred at about 7,000 training iterations and had an average AUC of about 0.67.

Second, the setup of the multi-task network was modified. A multi-task network having ten web variations was setup, corresponding to web variations 2-11. That network was trained with the 371,000 records. The first web variation was then added as a new web variation. The multi-task network was incrementally retrained by transferring the existing knowledge to the newly added web variation (e.g., the first web variation). Curve 820 shows the convergence for the first web page variation when this type of incremental retraining was used. As illustrated, the convergence occurred at about 1,000 training iterations and averaged about 0.67.

When comparing the convergence across both types of training, the incremental retraining converges faster (e.g., 1,000 training iterations in comparison to 7,000 iteration) without negatively impacting the performance. Thus, the test results provide evidence that incremental retraining can create a model with a high AUC for a newly introduced variation much more quickly when the multi-task neural network has been trained on other variations, than the time it would take to create a model with a similar AUC from scratch.

Figure 9:
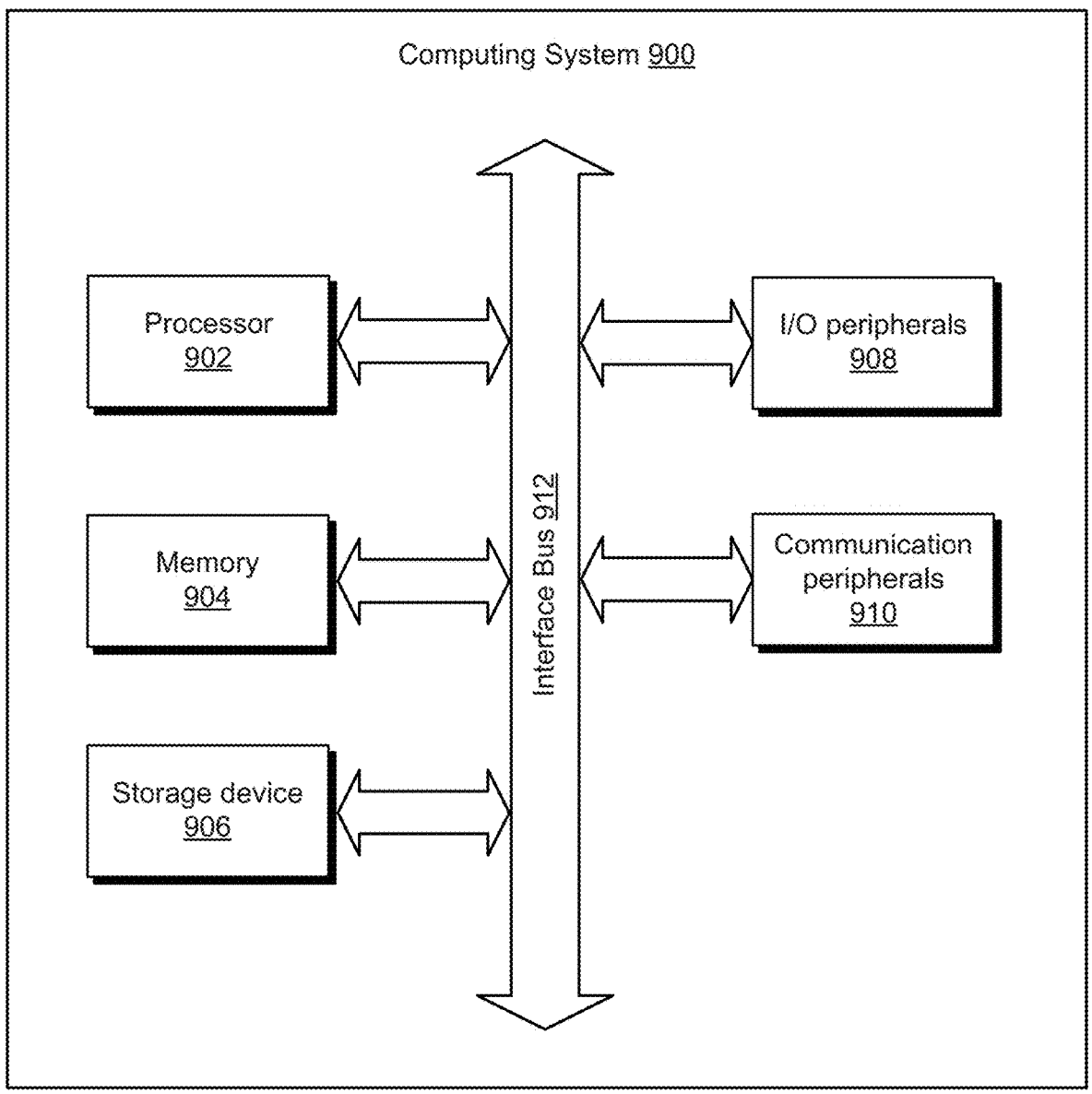
FIG. 9 illustrates an example computing environment suitable for use in implementations of the present disclosure.

Turning to FIG. 9, the figure illustrates example components for implementing some or all of the components of the computing environment of FIG. 1. Each of the clients 110A-110N, server 120, content management system 140, and/or entity computing resource 150 implements some or all of the illustrated components. Although these components are illustrated as belonging to a same computing system 900, the computing system 900 can be distributed.

The computing system 900 includes at least a processor 902, a memory 904, a storage device 906, input/output peripherals 908, communication peripherals 910, and an interface bus 912. The interface bus 912 is configured to communicate, transmit, and transfer data, controls, and commands among the various components of the computing system 900. The memory 904 and the storage device 906 include computer readable storage media, such as RAM, ROM, electrically erasable programmable read-only memory (EEPROM), hard-drives, CD-ROMs, optical storage devices, magnetic storage devices, electronic non-volatile computer storage, for example Flash® memory, and other tangible storage media. Any of such computer readable storage media can be configured to store instructions or program codes embodying aspects of the disclosure. The memory 904 and the storage device 906 also include computer readable signal media. A computer readable signal medium includes a propagated data signal with computer readable program code embodied therein. Such a propagated signal takes any of a variety of forms including, but not limited to, electromagnetic, optical, or any combination thereof. A computer readable signal medium includes any computer readable medium that is not a computer readable storage medium and that can communicate, propagate, or transport a program for use in connection with the computing system 900.

Further, the memory 904 includes an operating system, programs, and applications. The processor 902 is configured to execute the stored instructions and includes, for example, a logical processing unit, a microprocessor, a digital signal processor, and other processors. The memory 904 and/or the processor 902 can be virtualized and can be hosted within another computing system of, for example, a cloud network or a datacenter. The input and output peripherals 908 include user interfaces such as a keyboard, screen, microphone, speaker, other input/output devices, and computing components such as graphical processing units, serial ports, parallel ports, universal serial bus, and other input/output peripherals. The input/output peripherals 908 are connected to the processor 902 through any of the ports coupled to the interface bus 912. The communication peripherals 910 are configured to facilitate communication between the computing system 900 and other computing devices over a communications network and include, for example, a network interface controller, modem, wireless and wired interface cards, antenna, and other communication peripherals.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention claimed is:

1. A computer-implemented method comprising:
   detecting, by a content management system, an interaction of a client with a server, the content management system configured for customizing content presentations for the client based on the interaction of the client with the server;
   accessing, by the content management system, features associated with the client based on the interaction of the client with the server;
   predicting, by the content management system, responses of the client to potential content presentations based on a multi-task neural network, wherein:
     the features of the client correspond to an input layer of the multi-task neural network,
     the potential content presentations correspond to tasks of an output layer of the multi-task neural network,
     the tasks specify usages of the potential content presentations, and
     the multi-task neural network is trained based on historical data associated with the potential content presentations through backpropagation, wherein a backpropagation gradient from one of the tasks having a non-existence label is set to zero;
   selecting, by the content management system, a content presentation from the potential content presentations based on the responses;
   providing, by the content management system to the client for presentation, the content presentation based on a task of the multi-task neural network corresponding to the content presentation;
   adding, by the content management system, a new task to the multi-task neural network, the new task corresponding to a new potential content presentation; and
   incrementally retraining, by the content management system, the multi-task neural network based on a set of responses of a set of clients to the new potential content presentation rather than the historical data associated with the potential content presentations.

2. The computer-implemented method of claim 1, wherein selecting the content presentation is further based on a rule, wherein the rule specifies a selection based on a predicted likelihood of a response to the content presentation.

3. The computer-implemented method of claim 1, wherein selecting the content presentation is further based on a rule, wherein the content management system stores the rule based on input received from a computing device of an entity that is associated with content of the content presentation, and further comprising:
   tracking metrics about selections of the potential content presentations; and
   providing the metrics to the computing device of the entity, wherein the providing enables the entity to manage usage of the potential content presentations via the computing device.

4. The computer-implemented method of claim 1, wherein selecting the content presentation is further based on a comparison of the responses to the potential content presentations.

5. The computer-implemented method of claim 1, wherein a hidden layer of the multi-task neural network is configured to transform the features associated with the client to a set of shared features across the tasks.

6. The computer-implemented method of claim 1, a hidden layer of the multi-task neural network is configured to apply a non-linear transformation to the features associated with the client.

7. The computer-implemented method of claim 1, wherein the multi-task neural network comprises a hierarchy of hidden layers between the input layer and the output layer.

8. The computer-implemented method of claim 1, wherein the multi-task neural network is configured to apply a non-linear transformation to the features associated with the client, wherein the non-linear transformation is selected from potential non-linear transformations based on a cross-validation that utilizes a training dataset.

9. The computer-implemented method of claim 1, further comprising:
tracking, by the content management system, historical data that comprises historical responses of clients to the potential content presentations; and
training, by the content management system, the multi-task neural network based on the historical data.

10. The computer-implemented method of claim 1, further comprising:
tracking, by the content management system, the responses of the set of clients to the new potential content presentation for retraining the multi-task neural network.

11. A system comprising:
a processor;
a memory communicatively coupled to the processor and bearing instructions that, upon execution by the processor, cause the system to at least:
detect a request from a computing device of a user for a web page;
access features associated with the user based on the request;
predict user responses to candidate variations of the web page based on a multi-task neural network, wherein
the features associated with the user correspond to an input layer of the multi-task neural network,
the candidate variations of the web page correspond to tasks of an output layer of the multi-task neural network,
the tasks specify usage of the candidate variations of the web page, and
the multi-task neural network is trained based on historical data associated with the candidate variations of the web page through backpropagation, wherein a backpropagation gradient from one of the tasks having a non-existence label is set to zero;
select a variation of the web page from the candidate variations of the web page based on the user responses;
provide the variation of the web page for presentation at the computing device based on a task of the multi-task neural network corresponding to the variation;
add a new task to the multi-task neural network, the new task corresponding to a new variation of the web page; and
incrementally retrain the multi-task neural network based on a set of responses of a set of users to the new variation of the web page rather than the historical data associated with the candidate variations of the web page.

12. The system of claim 11, wherein a user response to the variation comprises a user conversion that is based on a presentation of the variation of the web page at the computing device.

13. The system of claim 11, wherein predicting the user responses comprises determining likelihoods of user conversions.

14. The system of claim 11, wherein selecting the variation of the web page comprises determining that a user response to the variation corresponds to the highest likelihood of a user conversion relative to remaining responses.

15. The system of claim 11, wherein the features associated with the user comprise information about the user, information about the computing device of the user, and information about the web page requested from the computing device of the user.

16. The system of claim 11, wherein the variation of the web page comprises a particular advertisement to be displayed on the web page or a particular location within the web page to display an advertisement.

17. A non-transitory computer-readable storage medium storing instructions that, when executed on a system, configure the system to perform operations comprising:
detecting an interaction of a client with a server;
accessing features associated with the client based on the interaction;
predicting responses of the client to potential presentations of content at the client based on a multi-task neural network, wherein
the features associated with the client correspond to an input layer of the multi-task neural network,
the potential presentations of content correspond to tasks of an output layer of the multi-task neural network,
the tasks specify usage of the potential presentations of content, and
the multi-task neural network is trained based on historical data associated with the potential presentations of content through backpropagation, wherein a backpropagation gradient from one of the tasks having a non-existence label is set to zero;
selecting a presentation of content from the potential presentations of content based on the responses;
providing the presentation of content to the client based on a task of the multi-task neural network corresponding to the presentation of content;
adding a new task to the multi-task neural network, the new task corresponding to a new presentation of content; and
incrementally retraining the multi-task neural network based on a set of responses of a set of clients to the new presentation of content rather than the historical data associated with the potential presentations of content.

18. The non-transitory computer-readable storage medium of claim 17, wherein the presentation of content comprises at least one of particular content or particular placement of content within a user interface of the client.

19. The non-transitory computer-readable storage medium of claim 17, wherein the presentation of content is based on a particular marketing channel to provide advertisement to the client.

20. The non-transitory computer-readable storage medium of claim 17, wherein the system comprises the server.

* * * * *